T. KING.
MILK-COOLER.

No. 179,322.  Patented June 27, 1876.

Witnesses:
Theodo Hoster.
Fred E. Bond.

Inventor:
Thomas King
By B. E. Clark
his atty.

UNITED STATES PATENT OFFICE.

THOMAS KING, OF MIDDLETOWN, NEW YORK, ASSIGNOR TO THE ORANGE COUNTY MILK ASSOCIATION.

IMPROVEMENT IN MILK-COOLERS.

Specification forming part of Letters Patent No. 179,322, dated June 27, 1876; application filed June 7, 1876.

*To all whom it may concern:*

Be it known that I, THOMAS KING, of the town of Middletown, in the county of Orange, State of New York, am the inventor of a certain Machine for the Cooling of Milk, of which the following is a specification, reference being had to the accompanying drawing, forming part of the same, in which—

Figure 1:
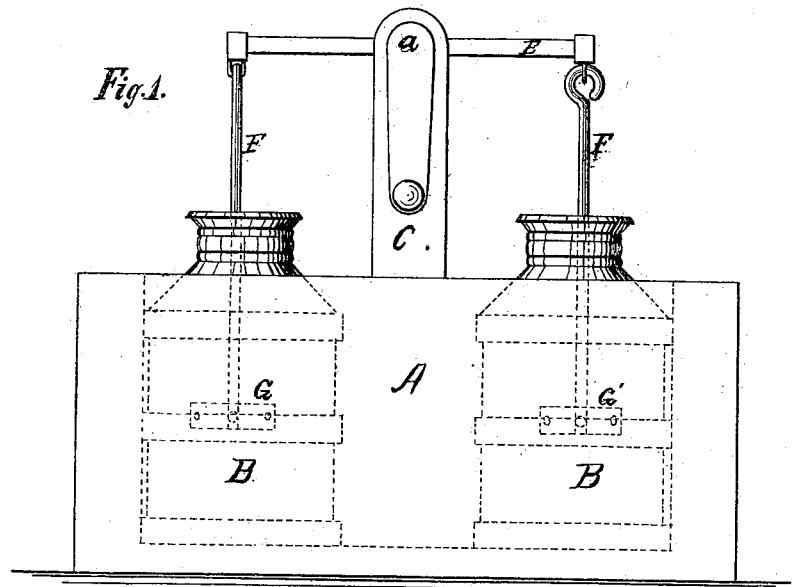
Figure 2:
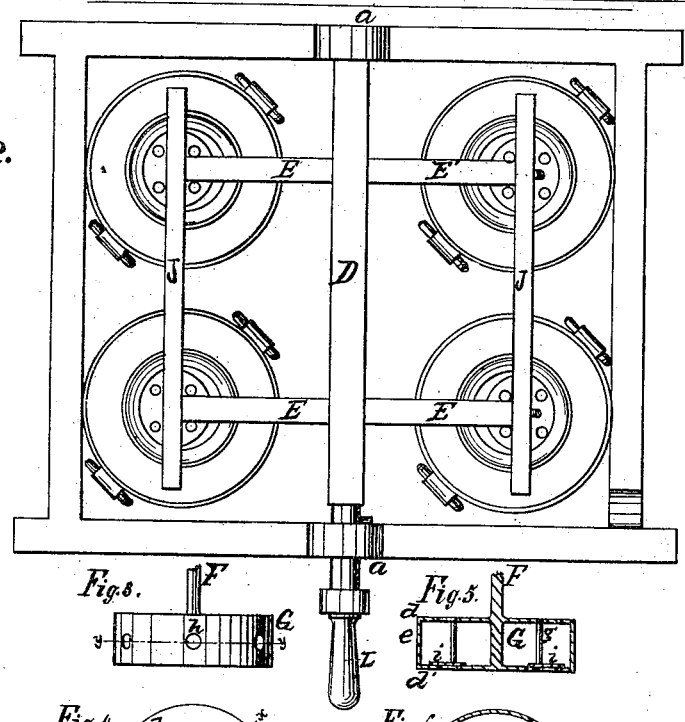
Figure 3:
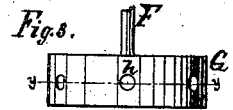
Figure 5:
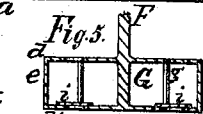
Figure 4:
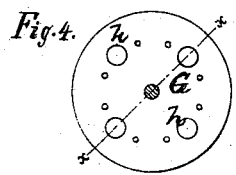
Figure 6:
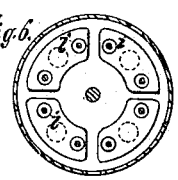

Figure 1 is a side view of the machine containing my invention. Fig. 2 is a top view of the same. Fig. 3 is a side view of one of the dasher-heads or stirrers, showing the side with its perforations. Fig. 4 is a section of Fig. 3 on line $x\ x$. Fig. 5 is an external side view, the side being removed; and Fig. 6 is a plan view of the lower plate of the same, showing the position of the button-piece, which serves to act as the valve-closer between the upper and lower plate.

My invention relates to the cooling of milk by agitation or stirring, with one motion and at one time, with dasher-heads or stirrers, so constructed as to give a constant motion to the liquid, so thoroughly changing and mixing the particles of milk that each particle in its turn is thrown to the side of the vessel in which it is placed, thus bringing the milk into contact with a surface colder than itself, and by constant agitation throwing off all gases formed, which are incidental to new milk, or milk which has undergone any process of condensation.

In the drawings, A represents the trough, into which either spring or iced water, according to the temperature desired, is conducted by a pipe or pipes, and into this water are placed cans B B, containing the substance which it is desired to cool. From the center of the side of the trough uprights or supports C C extend, one only being shown in Fig. 1, in the upper ends of which is placed the bar or rod D, having its bearings at $a\ a$, and passing through this bar are the arms E E′, to the outer ends of which are fastened, by any suitable means, the pendent rods F F. To the lower ends of these pendants are fixed the dasher-heads G G. The pendent rods are of such a length that when one of the arms E is at its lowest limit of motion, the dasher-head G will rest on, or be near to, the bottom of the can, while, on the opposite side, the dasher-head G′ is raised to the top or neck of the can when the arm E has reached its highest limit of motion. The dasher-head G G′ consists of two flat circular disks or pieces of metal, $d\ d'$, of a size suitable to the dimensions of the cans, joined or fastened together by the side piece $e$, soldered or otherwise fastened. The rods or wires $g\ g$, when used, also serve to hold the plates together. In the top, bottom, and side pieces are made perforations or round holes $h$. Between the upper and lower plates $d\ d'$, and fastened on the wires $g\ g$, are pieces of tin, or, as I call them, "valve-buttons," $i$, so constructed and formed as to move freely up and down on the said wires when pressure is applied. L is a handle, fixed or fastened in the lower end of the piece H, which piece is fastened to one end of the bar D, which projects over from the post C.

The operation of my machine is as follows: The handle L being turned partly around, the bar D is moved, raising the opposite arm E, carrying with it the pendant F and the dasher-head G, while the opposite arm E′ is lowered, carrying the pendant F down, and dasher-head G′ is moved down to or near the bottom of the can, and by reversing the movement the dasher-head G′ is raised and the dasher-head G is lowered. As the dasher-heads are thus moved up and down, the milk, by its own weight and the pressure of the atmosphere, is pressed down through the apertures $h$ in the face of the plate $d$; but the weight of the milk presses the button or valve-piece $i$ closely over the aperture in the lower plate, and the milk is forced out through the apertures made in the side piece $e$, and thrown against the cold sides of the can.

When the movement is reversed the button or valve-piece, by the pressure of the milk as the head is forced down, is thrown against and covers the apertures in the upper plate, and the milk is forced to exit through the side apertures. Thus, by either movement, the milk is thrown against the cold sides of the can.

When the milk is of a heavy consistency, as is often the case with condensed milk, the valve-pieces may be dispensed with, the added degree of consistency of the milk forcing the milk through the side apertures.

The trough is filled with running water, introduced by means of pipes or other means, which water, after the trough is full, passes over one end, made lower for that purpose, keeps a constant even temperature around the sides of the cans, and as the milk is thrown against the inner sides of the cans imparts its temperature to the milk and cools gradually to the desired temperature. If a temperature below that of running water is desired, the water in the trough may be iced.

The necks of the cans rise above the sides of the trough, to prevent the flow of water into them and mingling with the contents.

Any suitably-constructed machinery may be employed to convey or impart motion to the bar D, instead of using the handle L. When used as a cooler for condensed milk, and a great number of cans are to be operated on at the same time, this will be found to be the most practicable mode of operation.

A single side motion, given to the pendant F while in motion, will throw the head against the sides of the can as the dasher-head moves up or down, and scrape the milk from the sides. These dasher-heads can be duplicated to any desired number, saving much labor of stirring by hand, as is commonly done.

After the milk is thoroughly cooled, and all gases necessarily attendant have passed off, as will be the case by this means of constant unintermittent process of stirring, each particle, in turn, being exposed to the air and the cold surface, the dasher-heads may be readily removed, and the cans with their contents shipped to their destination without a rehandling or pouring out of their contents.

The bar and upright may be made so as to move laterally from the line of the center of the trough, if needed; but the operation will be firmer and more complete without this arrangement, and I do not hereby claim the same.

When a great number of cans are to be filled and contents cooled, the pendants may be attached to a long bar, J, made of any desired length, which is fastened to the ends of the arms E, as shown in Fig. 2. By this means only two arms on a side may be used to serve to move a great number of pendants and dasher-heads, which will be fixed in the bars J.

What I claim, and desire to secure by Letters Patent, is—

1. A hollow dasher-head consisting of the pieces $d$ $d'$ $e$, with apertures $h$ and valves $i$, substantially as and for the purpose set forth.

2. The dasher-head G, consisting of the pieces $d$ $d'$ $e$, with apertures $h$ and valves $i$, connected by the pendant F with suitable operating mechanism, for the purpose set forth and described.

THOS. KING.

Witnesses:
  N. M. HALLOCK,
  GEORGE CONKLIN.